Figure 1:
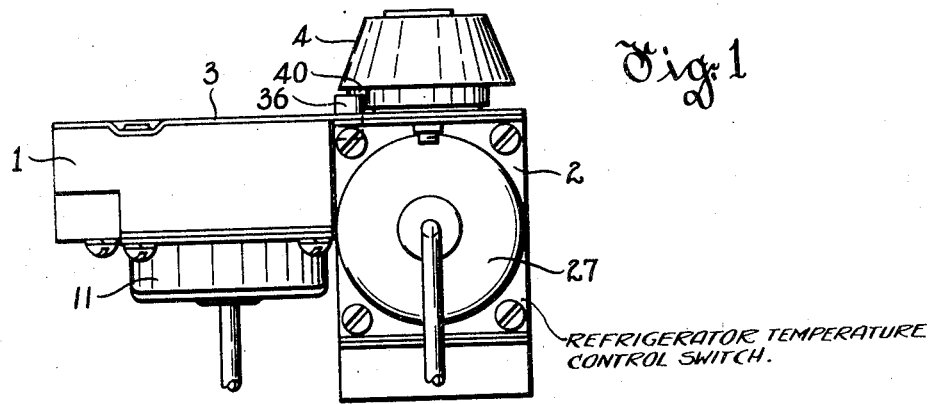

Nov. 29, 1949  C. W. KUHN  2,489,906

REFRIGERATOR CONTROL AND ALARM SYSTEM

Filed Oct. 15, 1945

Inventor
Clarence W. Kuhn
By Frank H. Hubbard
Attorney

Patented Nov. 29, 1949

2,489,906

UNITED STATES PATENT OFFICE 2,489,906

REFRIGERATOR CONTROL AND ALARM SYSTEM

Clarence W. Kuhn, Wauwatosa, Wis., assignor to Cutler-Hammer, Inc., Milwaukee, Wis., a corporation of Delaware Application October 15, 1945, Serial No. 622,435

3 Claims. (Cl. 177—311)

1

This invention relates to refrigerator control systems and while not limited thereto is particularly applicable to alarm control systems for electric refrigerators of the type commonly known as home freezers.

It is desirable that refrigerators of various types and particularly home freezers be equipped with an alarm control device which operates under abnormal temperature conditions within the freezing compartment to indicate that the refrigerator is not functioning properly and requires attention. The present invention has among its objects to provide a simple and reliable alarm control device for this purpose.

Another object is to provide a unitary alarm control device for the above purpose which is complete in itself and is provided with a pressure responsive operating element of the gas containing type.

Another object is to provide an alarm control device of the aforesaid type which is responsive to operate a signal either upon a predetermined abnormally high or a predetermined abnormally low temperature within the freezing compartment and is also responsive to operate the signal upon failure of its associated operating element.

Another object is to provide an alarm control device of the aforesaid character which is readily adjustable to provide for operation thereof at selected high and low abnormal temperature values within the freezing compartment and which is also provided with an "Off-On" control for rendering the same operative or inoperative, as desired.

Another object is to provide a unitary control device of the aforesaid type which is capable of being associated with an adjustable cold control device of the type ordinarily employed in connection with electric refrigerators to provide for actuation of the "Off-On" control element by means of a cold control adjusting knob associated with the cold control device.

Another object is to provide an "Off-On" control of the aforesaid character which prevents restoration of the alarm control device to operative condition after an abnormally high temperature condition until the temperature in the freezing compartment drops to a given normal value.

Various other objects and advantages of the invention will hereinafter appear.

The accompanying drawing illustrates an embodiment of the invention which will now be described, it being understood that various modifications may be made in the embodiment illustrated without departing from the spirit and scope of the appended claims.

Figure 2:
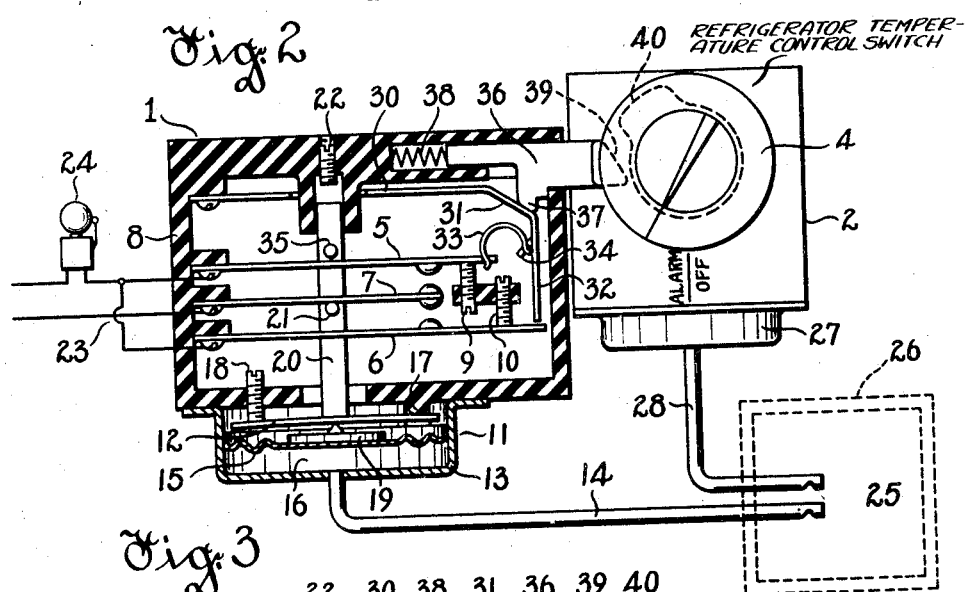
Figure 3:
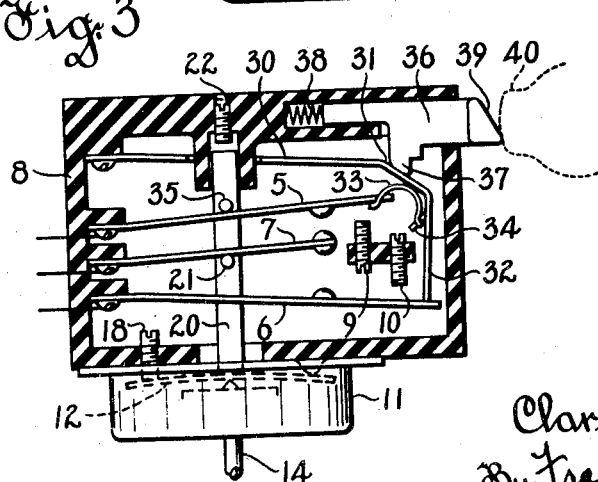

In the drawing,

Figure 1 illustrates an alarm control device embodying the invention in connection with an adjustable cold control device of a type commonly employed in the control of electric refrigerators;

Fig. 2 schematically illustrates the alarm control device shown in Fig. 1 with the control mechanism thereof in an operative condition, and Fig. 3 schematically illustrates the alarm control device in an inoperative condition.

Referring to Fig. 1, reference character 1 designates an alarm control device embodying the invention which is shown in connection with an automatic temperature control device 2 of the type disclosed in the patent to C. F. Robbins, No. 2,375,387, issued May 8, 1945. These devices are both secured to a front plate 3 to provide a unitary assembly. Device 2 is adapted to maintain the temperature within the freezing compartment of an electric freezer between given upper and lower working limits which are determined by the setting of a rotatable adjusting knob 4, and as hereinafter set forth device 1 operates upon an abnormally high or an abnormally low temperature condition within the refrigerating chamber to actuate a signal which may be either audible or visible to indicate that the freezer is not functioning properly and requires attention. Also as hereinafter set forth the alarm control device 1 is provided with an "Off-On" control which is operable by the cold control knob 4 associated with device 2 to render the alarm control device operative or inoperative, as desired.

As schematically illustrated in Fig. 2, alarm control device 1 is provided with a switch mechanism comprising spaced upper and lower spring contact fingers 5 and 6, and an intermediate spring contact finger 7. These contact fingers are mounted within an insulating casing 8 and each is fixed at one end to said casing. The free end of upper contact finger 5 is biased to move downwardly and is normally maintained in engagement with an adjustable screw stop 9, and the free end of lower contact finger 6 is biased to move upwardly and is normally maintained in engagement with an adjustable screw stop 10. The free end of intermediate contact finger 7 is biased to move downwardly and as will now be set forth said finger is controlled by a gas containing operating element 11 having a loading spring 12 associated therewith.

Operating element 11 comprises a rigid cup member 13 having a closed tube extension 14 on the bottom wall thereof, and a flexible metal diaphragm 15 sealed within said cup member. Diaphragm 15 is spaced with respect to the bottom wall of cup member 13 to provide a closed chamber 16 and said chamber and tube extension 14 are filled with a fluid such as propane. The open end of cup member 13 is provided with a flange projection which is fixed to the under side of casing 8 and loading spring 12 is interposed between said casing and diaphragm 15. Loading spring 12 comprises an elongated leaf spring member which is supported at opposite ends by a projection 17 and an adjustable stop 18 on the under side of casing 8. Loading spring 12 engages disk 19 on the upper side of diaphragm 15 to subject said diaphragm to a downward loading pressure. The intermediate contact finger 7 is operatively connected to operating element 11 by a vertically disposed insulating bar 20 having a projection 21 for engaging the under side of said finger. Bar 20 is slidably supported at its upper end within a recess in casing 8 and upward movement thereof is limited by an adjustable screw stop 22. The lower end of bar 20 is held in engagement with the upper side of loading spring 12 under the biasing action of contact finger 7.

Contact fingers 5, 6 and 7 are connected as shown in Fig. 2 to control a signal circuit 23 including a signal device such as an electric bell 24. Also as shown in Fig. 2 tube extension 14 of operating element 11 is arranged within the freezing compartment 25 of an electric freezer 26 which is indicated by dotted lines, and the automatic temperature control device 2 is provided with a gas filled operating element 27 having a tube extension 28 which is also located within said compartment. Temperature control device 2 is controlled by its associated operating element 27 to automatically maintain the temperature within the freezing compartment between selected upper and lower working limits which are determined by the setting of knob 4. As will now be set forth, alarm control device 1 is automatically controlled by its associated operating element 11 to provide for actuation of alarm 24 either upon an abnormally high or an abnormally low temperature condition within compartment 22 or upon failure of pressure in said operating element.

Loading spring 12 is adjusted by its associated stop 18 so that intermediate contact finger 7 is maintained midway between the upper and lower contact fingers 5 and 6 when the temperature in compartment 25 is at a given normal operating value. When the temperature in compartment 25 rises above said normal operating value, diaphragm 15 moves upwardly against the action of loading spring 12 to move contact finger 7 toward upper contact finger 5, and when the temperature in said compartment drops below said normal operating value said diaphragm moves downwardly under the action of said loading spring to permit biased movement of contact finger 7 toward lower contact finger 6. Upon a given abnormally high temperature condition in compartment 25 which is determined by the setting of screw stop 9, contact finger 7 engages contact finger 5 to close circuit 23 for sounding of the alarm 24. Also upon a given abnormally low temperature condition in compartment 25 which is determined by the setting of screw stop 10, contact finger 7 engages lower contact finger 6 to close the circuit 23 for sounding of alarm 24. In connection with the foregoing it should be noted that if operating element 11 fails due to leakage of the gas fill in chamber 16, diaphragm 15 collapses under the action of loading spring 12 and contact finger 7 is thus moved into engagement with lower contact finger 6 to close the alarm circuit 23 for indication of this condition.

As will now be set forth, the above described alarm control device is provided with an "Off-On" control mechanism which is operable by the adjusting knob 4 of temperature control device 2 to open the alarm circuit 23 under any of the aforementioned abnormal conditions. This control comprises a horizontally disposed leaf spring member 30 having one end fixed within casing 8 and having an inclined cam portion 31 and a downwardly extending leg 32 formed on the free end thereof. Member 30 is biased to move upwardly into the position shown in Fig. 2 and upon downward movement thereof from such position extension 32 engages lower contact finger 6 to move the same downwardly out of engagement with stop 10 into the position shown in Fig. 3. Also the free end of member 30 is operatively connected to upper contact finger 5 by a bow spring 33 which is held under compression between the free end of said contact finger and a projection 34 on leg 32. Upon downward movement of member 30 out of the position shown in Fig. 2 bow spring 33 operates to effect upward movement of upper contact finger 5 away from stop 9 into the position shown in Fig. 3. Bow spring 33 acts upon return of member 30 to the position shown in Fig. 2 to maintain upper contact finger 5 in the position shown in Fig. 3, and said finger is resettable in the position shown in Fig. 2 by a stop 35 associated with bar 20.

Member 30 has a horizontally disposed operating element 36 associated therewith which is slidably supported upon casing 8 and is provided with a downwardly extending projection 37 for engaging cam portion 31. Operating element 36 is biased to move toward the right into the position shown in Fig. 2 by a spring 38 and the front end thereof is provided with a cam face 39 to be engaged by a projection 40 on knob 4. Projection 40 acts upon movement of knob 4 in a counter-clockwise direction into the "alarm off" position shown in Fig. 2 to move operating element 36 toward the left for downward movement of member 30 from the position shown in Fig. 2 into the position shown in Fig. 3. Movement of knob 4 out of off position permits return of element 36 and member 30 to the normal position shown in Fig. 2.

Assume that contact finger 7 has moved into engagement with upper contact finger 6 in response to an abnormally high temperature condition in chamber 25. Upon movement of knob 4 into "alarm off" position bow spring 33 operates as hereinbefore set forth to move upper contact finger 5 into the position illustrated in Fig. 3, and said finger 5 is thus moved out of engagement with contact finger 7 to open the alarm circuit 23. Upon movement of knob 4 out of its "alarm off" position, upper contact finger 5 is maintained in the position shown in Fig. 3 under the action of bow spring 33 to prevent immediate reestablishment of alarm circuit 23. However, assuming that the temperature in the freezing compartment 25 is reduced, contact finger 7 returns toward the normal position shown in Fig. 2 and at a predetermined normal temperature condition in said compartment upper contact finger 5 is returned to the normal position shown in Fig. 2 by stop 35. Upper contact finger 5 is thus reset to provide for reestablishment of alarm circuit 23 if the temperature in compartment 25 again rises to an abnormally high value.

Assume now that contact finger 7 has moved into engagement with contact finger 6 in response to an abnormally low temperature condition in compartment 25 or in response to failure of gas pressure in chamber 16 of operating element 11. Upon movement of knob 4 into "alarm off" position, contact finger 6 is moved downwardly into the position shown in Fig. 3 to disengage the same from contact finger 7 for opening of the alarm circuit 23. When knob 4 is moved out of "alarm off" position lower contact finger 6 is returned immediately to the position shown in Fig. 2 to provide for re-establishment of alarm circuit 23 if operating element 11 is inoperative or if the temperature in compartment 25 is still at an abnormally low value.

What I claim as new and desire to secure by Letters Patent is:

1. In a refrigerator control system, the combination with a temperature responsive control device for automatically controlling starting and stopping of a refrigerator to normally maintain the temperature therein within a predetermined working range, said device having a manual adjusting part associated therewith for varying the limits of said working range, of a temperature responsive alarm control device associated with said former control device and operable independently thereof to actuate an associated signal in response to an abnormal temperature condition within the refrigerator outside of said working range, said alarm control device being controllable by said adjusting part to render the same inoperative to actuate said signal upon movement of said adjusting part into a given position and to restore the same to operative condition upon movement of said adjusting part out of said given position.

2. In a refrigerator control system, the combination with a temperature responsive control device for automatically controlling starting and stopping of a refrigerator to normally maintain the temperature therein within a predetermined working range, said device having a manual adjusting part associated therewith for varying the limits of said working range, of a temperature responsive alarm control device associated with said former device and operable independently thereof to actuate an associated signal in response to an abnormally high temperature condition within the refrigerator which is above said working range, said alarm control device being controllable by said adjusting part to render the same inoperative to actuate said signal upon movement of said adjusting part into a given position and to restore the same to operative condition upon movement of said adjusting part out of said given position but only upon restoration of the temperature within the refrigerator to a predetermined value within said working range.

3. In a refrigerator control system, the combination with a temperature responsive control device for automatically controlling starting and stopping of a refrigerator to normally maintain the temperature therein within a predetermined working range, said device having a manual adjusting part associated therewith for varying the limits of said working range, of a unitary temperature responsive alarm control device associated with said former device and operable independently thereof to actuate an associated signal in response to a predetermined abnormally high or a predetermined abnormally low temperature condition within the refrigerator, said alarm control device having control means associated therewith which is operable by said adjusting part to render the same inoperative to actuate said signal upon movement of said adjusting part into a given position and to restore the same to operative condition upon movement of said adjusting part out of said given position.

CLARENCE W. KUHN.

RLFERENCES CITED

The following references are of record in the file of this patent:

UNITED STATES PATENTS

| Number | Name | Date |
| --- | --- | --- |
| 934,754 | Porter | Sept. 21, 1909 |
| 2,092,085 | Riley | Sept. 7, 1937 |
| 2,115,027 | Leonard | Apr. 26, 1938 |
| 2,238,071 | Nazar | Apr. 15, 1941 |
| 2,408,667 | Martin | Oct. 1, 1946 |
| 2,447,893 | Bauman | Aug. 24, 1948 |
| 2,447,895 | Bauman | Aug. 24, 1948 |